United States Patent
Handtmann et al.

[11] 3,808,422
[45] Apr. 30, 1974

[54] POLARIZED-LIGHT HEADLIGHT

[75] Inventors: Dieter Handtmann, Stuttgart-Mohringen; Karl Kerner, Stuttgart; Ernst Zehender, Ottenbrunn, all of Germany

[73] Assignee: Robert Bosch GmbH, Stuttgart, Germany

[22] Filed: Apr. 9, 1973

[21] Appl. No.: 349,661

[30] Foreign Application Priority Data
Apr. 8, 1972 Germany................... 2216991

[52] U.S. Cl. .................................................. 240/9.5
[51] Int. Cl............................. F21v 3/00, F21v 3/26
[58] Field of Search ......... 240/9.5; 350/4, 147, 152, 350/154, 155, 156

[56] References Cited
UNITED STATES PATENTS
2,423,371  7/1947  Carranza.............................. 350/4
2,748,659  6/1956  Geffeken et al. .................... 240/9.5

FOREIGN PATENTS OR APPLICATIONS
935,663  1/1956  Germany...................... 240/9.5

Primary Examiner—Samuel S. Matthews
Assistant Examiner—Russell E. Adams, Jr.
Attorney, Agent, or Firm—Michael S. Striker

[57] ABSTRACT

The headlight includes a light source, a first polarizing unit including an interference polarizer positioned to polarize light originating from the light source but effecting only incomplete polarization of such light. The headlight further includes a second polarizing unit including an absorption polarizer positioned to further polarize light polarized by the interference polarizer.

14 Claims, 5 Drawing Figures

POLARIZED-LIGHT HEADLIGHT

BACKGROUND OF THE INVENTION

The invention relates to headlights, searchlamps and the like of the type adapted to project a beam of polarized light.

It is already known to provide automotive-vehicle headlights adapted to project a beam of polarized light. The projection of polarized light, as opposed to unpolarized light, need not materially affect the driver's field of vision during night driving. However, if oncoming vehicles are provided with front windshields including a layer of polarizing material, the glare from the headlight projecting beam of polarized light will be significantly reduced.

It is already known to provide a vehicle headlight with one or more layers of polarizing material extending across the path of the projected beam. Such polarizing material may for instance be polaroid. This type of polarizing material polarizes a beam of unpolarized light by transmitting light waves whose electric-field vectors are parallel to the preferential polarization direction of the polarizing material. Light waves whose electric-field vectors are perpendicular to the preferential poarization direction do not pass through the polarizing material, or pass through only in very attenuated form, and the energy associated with the light waves which do not pass through the polarizing material is absorbed by the material itself, resulting in heating up of the polarizing material.

To accomplish the glare-reduction effect mentioned above, it is usually desired that the degree of polarization be extremely high, for instance as high as 99.5 percent. When unpolarized light is passed through polaroid, there is an undesired attenuation of light waves whose electric-field vector lies in the preferential polarization direction, in addition to the desired attenuation of light waves whose electric-field vector is perpendicular thereto. To achieve the desired high degree of polarization the polarizing material must absorb nearly all of the energy of the light-waves having the perpendicular electric-field vector, this constituting 50 percent of the energy of the unpolarized light. In addition, however, the polarizing material will absorb about half the energy of the light waves having the preferential polarization direction, this constituting another 25 percent of the energy of the initially unpolarized light. Clearly, only about 25 percent of the total energy of the initially unpolarized light is actually available for purposes of illumination, and this cannot be considered efficient operation. In addition, the absorption of so much energy by the polarizing material can have adverse effects upon the polarizing material itself.

In order to improve the efficiency of such polarization headlights, it is already known to use the reflection-transmission polarization expedient of Malus and Norremberg. The plurality of parallel reflective surfaces required for a highly efficient reflection polarizer of this kind can be provided by successive deposition onto light-transmissive foundation layer of a plurality of layers of dielectric material having alternating higher and lower indices of refraction. By making these layers quarter-wave layers, the number of layers necessary for high efficiency can be minimized. This expedient is disclosed in German patent 935,663. The disadvantage of this expedient lies in the high precision requirements, which make the prior-art arrangement relatively expensive. Also, in the known arrangement it has been necessary to maintain fixed the outlet surface of the light beam, and this has created the need for an expensive cylindrical lenticular grid.

In the above-mentioned German patent, another polarization headlight is disclosed which includes, in addition to the first-mentioned interference polarizer, a second interference polarizer. The second interference polarizer is employed to further polarize the light incompletely polarized by the first interference polarizer. For these two interference polarizers to cooperate in the intended manner, extreme precision in their relative orientation must be achieved. This is expensive to accomplish and sometimes difficult to maintain.

SUMMARY OF THE INVENTION

It is the general object of the present invention to overcome the disadvantages of known polarized-light headlight constructions.

It is a more particular object of the present invention to provide a polarized-light headlight which employs simple polarizing means capable of achieving a high degree of polarization with little waste of the energy contained in the initially unpolarized light.

These objects, and others which will become more understandable from the following description, can be met according to the invention by providing, in a headlight of the type adapted to project a beam of polarized light, in combination, a light source, first polarizing means including interference polarizer means positioned to polarize light originating from the light source but effecting only incomplete polarization of such light, and second polarizing means including absorption polarizer means positioned to further polarize light polarized by the interference polarizer means.

The arrangement according to the invention avoids disadvantages of the prior-art arrangements in a very dramatic manner. By employing interference polarizer means, one succeeds in separating initially unpolarized light into two or more differently polarized, and incompletely polarized, beams of light. The loss of energy in dividing the unpolarized light into such differently polarized beams of light is extremely small. By thereafter providing additional polarizing means in the form of an absorption polarizer, it is possible to polarize light which is already polarized to a considerable degree, thereby eliminating the energy losses and avoiding the heat build-up resulting when adsorption polarizers are employed to polarize completely unpolarized light. Moreover, by first separating the unpolarized light into two differently polarized, and incompletely polarized, components, the subsequent increase of polarization degree can be accomplished with respect to both components, yielding two highly polarized light components which can be modified and combined to yield linearly polarized, circularly polarized or elliptically polarized light, as desired. It will be appreciated that most of the energy of the initially unpolarized light will be conserved, so that the arrangement according to the invention is characterized by extremely high efficiency.

Moreover, as will become more understandable from the description of the specific embodiments, the arrangements according to the invention can be very easily manufactured from simple components the relative orientation of which need not be perfectly exact to accomplish the desired results in the desired manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
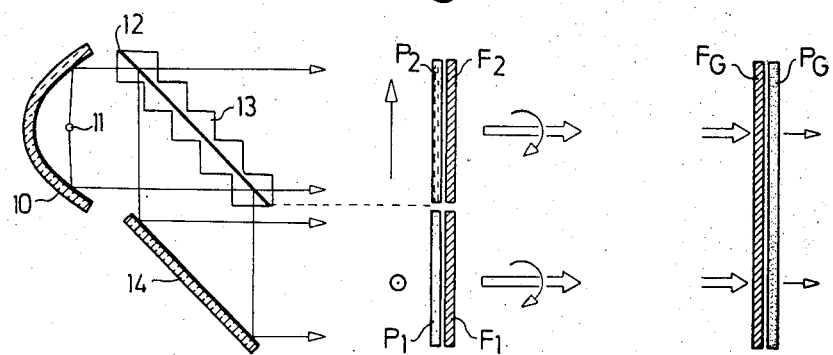
FIG. 1 illustrates schematically a first embodiment according to the invention.

Referring firstly to FIG. 1, it is noted that reference numeral 10 identifies a parabolic reflector at whose focal point is positioned a light source 11. As is well known to persons skilled in the art, all the light rays emitted by the light source 11 and travelling in direction towards the reflector 10 will be reflected by the latter and thereafter travel in direction parallel to the optical axis of the reflector, which in the drawing is the horizontal symmetry line of the reflector.

Arranged at an angle of 45° relative to the path of light rays reflected by the reflector 10 is an interference polarizer 12. The interference polarizer 12 is formed by depositing onto a foundation layer of light-transmissive material successive layers of dielectric material of alternating higher and lower refractive index. The interference polarizer 12 is embedded within the refractive material of a stepped prism 13. The outer boundary surfaces of the stepped prism 13 are planar and are either parallel or perpendicular to the optical axis of the parabolic reflector of the headlight.

Light reflected by reflector 11 travels horizontally in rightwards direction towards the interference polarizer 12. A portion of the light incident upon the polarizer 12 is transmitted by the polarizer 12 and continues to travel in direction parallel to the optical axis of the headlight. Another portion of the light incident upon the polarizer 12 is reflected at right angles to the optical axis downwardly towards planar mirror 14, in this embodiment. Both the transmitted light and the reflected light are linearly polarized, in different directions, and somewhat incompletely. For the purposes of explanation, it will be assumed that the light transmitted by polarizer 12 in direction parallel to the optical axis has an electric-field vector lying in the plane of the drawing and pointing in the direction of the arrow. The light reflected by polarizer 12 in downwards direction towards planar mirror 14 is assumed to have an electric-field vector extending normal to the plane of the drawing and directed away from the viewer.

It will be noted that planar mirror 14 is oriented parallel to the interference polarizer 12. Mirror 14 serves to reflect in direction parallel to the optical axis that portion of the light originating from source 11 which was reflected by the interference polarizer 12. Accordingly, two differently polarized beams of light are directed towards the open end of the headlight. It will be appreciated that the light reflected from the polarizer 12, after subsequent reflection by mirror 14, remains polarized in the indicated direction.

The two beams of differently polarized, linearly polarized light are each of them, as indicated above, incompletely polarized; each of the two beams contains light waves whose electric-field vector has components lying in direction perpendicular to the predominant direction. It is desired to separately increase the degree of polarization of each of these two linearly polarized light beams. To this end, two different polarizing layers $P_1$ and $P_2$ are provided, one in the path of light transmitted by polarizer 12 and the other in the path of light reflected by polarizer 12, i.e., in the path of light reflected by mirror 14. The polarizing layer $P_2$ is so oriented that its preferential polarizing direction is perpendicular to the preferential polarizing direction of the polarizing layer $P_1$. The preferential polarizing direction of layer $P_2$ lies in direction from the bottom to the top of the drawing, while the preferential polarizing direction of layer $P_1$ extends normal to the plane of the drawing and points into that plane.

Positioned in the path of light transmitted by polarizing layer $P_1$ is a quarter-wave plate $F_1$, and positioned in the path of light transmitted by polarizing layer $P_2$ is a quarter-wave plate $F_2$. The orientation of each of the two quarter-wave plates is such as to convert the linearly polarized light transmitted therethrough into circularly polarized light.

At the right of FIG. 1 there is illustrated the windshield of an automobile travelling in direction opposite to the direction in which the beam of polarized light is projected. The illustrated windshield includes a quarter-wave plate $F_G$ and an absorption polarizing layer $P_G$. Very little of the circularly polarized light will be transmitted by the windshield comprised of layers $F_G$, $P_G$, and accordingly the driver sitting behind the windshield of such oncoming vehicle will be exposed to the irritating and hazardous effect of glare only to a very small degree.

Figure 2:
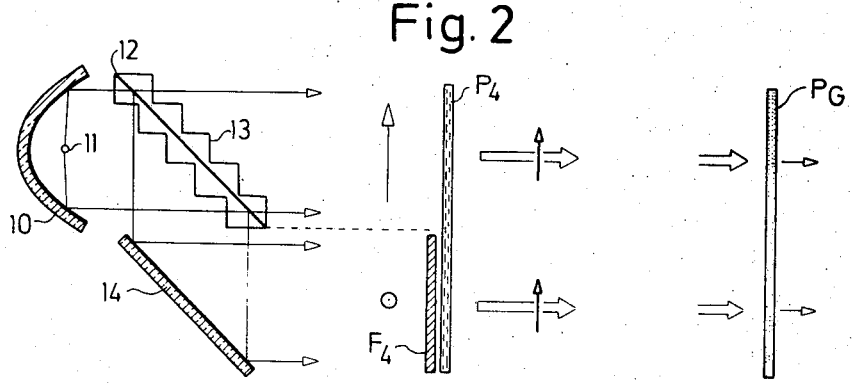
FIG. 2 illustrates a second embodiment according to the invention.

In the embodiment of FIG. 2, components 10, 11, 12, 13 and 14 shown in FIG. 1 are again present, and will not be described again. The difference with respect to the embodiment of FIG. 1 lies in the provision of the layers in the path of light transmitted by the interference polarizer and in the path of light reflected by the interference polarizer, i.e., reflected by mirror 14. In the path of light reflected by mirror 14 there is positioned a half-wave plate F. Provision of this half-wave plate causes a rotation by 90° of the polarization direction of the light reflected by mirror 14, so that the polarization direction of this light becomes substantially identical to the polarization direction of light transmitted by the interference polarizer 12. Accordingly, the headlight of FIG. 2 projects a beam of linearly polarized light, in contradistinction of the headlight of FIG. 1 which projects a beam of circularly polarized light.

If the headlight of FIG. 2 is employed, then the windshield of the oncoming vehicle need only include a layer of polarizing material $P_G$ having a preferential polarization direction oriented substantially perpendicular to the polarization direction of the light beam, to reduce very substantially the glare of the beam of the oncoming headlight.

Figure 3:
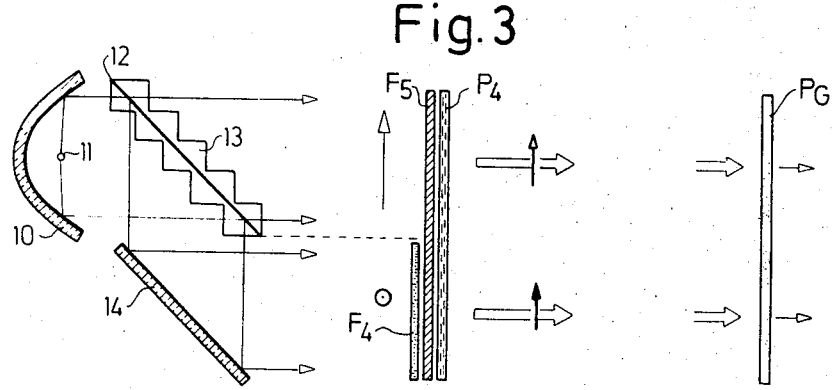
FIG. 3 illustrates a third embodiment according to the invention.

The embodiment shown in FIG. 3 differs from that of FIG. 2 in the provision between the half-wave plate $F_4$ and the polarizing layer $P_4$ of an additional half-wave plate $F_5$. The additional half-wave plate extends across the path of light transmitted by interference polarizer 12 and also across the path of light reflected by mirror 14. The second half-wave plate $F_5$ can be so oriented as to effect any desired rotation of the polarization of the polarized light transmitted by the interference polarizer 12 and by the first half-wave plate $F_4$; for instance, a polarization direction making an angle of 45° with respect to the horizontal may be desired.

Figure 4:
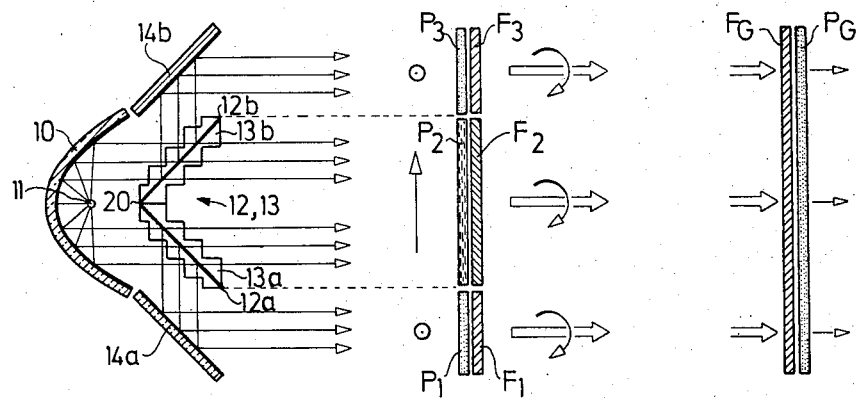
FIG. 4 illustrates a fourth embodiment according to the invention.

The fourth headlight, shown in FIG. 4, embodies the concept of the embodiment of FIG. 1. In FIG. 4, there is again provided a parabolic reflector 11 at whose focal point there is positioned a light source 11, so that again the parabolic reflector will reflect light in direction parallel to the optical axis. In the path of light reflected by the reflector 11 there is positioned an interference polarizer 12 embedded in a stepped prism arrangement 13, similar to that shown in FIG. 1. The system 12, 13 is configurated mirror-symmetrically with respect to a plane passing through the optical axis and oriented normal to the plane of the drawing. Line 20 represents the intersection of such symmetry plane and the physical arrangement itself. The two parts of the interference polarizing system are respectively identified by numerals 12a, 13a and 12b, 13b, and it will be seen that each of the two parts of the interference polarizer 12 is oriented at an angle of 45° with respect to the symmetry plane, and that the two parts of the interference polarizer 12 include between themselves an angle of 90°.

The embodiment of FIG. 4 performs as follows:

Light reflected in direction parallel to the optical axis by the reflector 11 will travel towards the interference polarizer units 12a, 12b. The interference polarizer unit 12a will transmit in direction parallel to the optical axis a portion of the light incident upon it, and will reflect in direction vertically upwards (as seen in the drawing) the remainder of the light incident upon it. Similarly, the interference polarizer unit 12b will transmit in direction parallel to the optical axis a portion of the light incident upon it, and will reflect in direction vertically downwards (as viewed in the drawing) the remainder of the light incident upon it.

The light transmitted by polarizer units 12a, 12b will have an electric-field vector oriented substantially parallel to the plane of the drawing and pointing upwards (as viewed in the drawing). Of course, the light transmitted by the interference polarizer will not be 100 percent polarized, and accordingly the direction of the electrical-field vector just mentioned is the direction of the predominant component of the electric-field vector of such polarized, but incompletely polarized light. Similarly, the light reflected by polarizer units 12a and 12b will be substantially linearly polarized and will have an electric-field vector which is directed substantially normal to the plane of the drawing and points into the plane of the drawing. Again, it will be understood that when it is stated that a particular beam of polarized light has an electric-field vector which is directed normal to or lies in the lane of the drawing, what is meant is that the predominant component of the electrical-field vector of such linearly polarized, but not 100 percent polarized, light will be oriented in such manner.

As with the embodiment of FIG. 1, the embodiment of FIG. 4 includes planar mirror means 14, here comprised of two parts 14a and 14b disposed mirror-symmetrically with respect to the symmetry plane 20. The lower mirror part 14a is so oriented with respect to the interference polarizer unit 12a as to reflect in direction parallel to the optical axis the light reflected by the polarizer unit 12a. Similarly, the upper mirror part 14b is so oriented with respect to the interference polarizer unit 12b as to reflect in direction parallel to the optical axis the light reflected by the polarizer unit 12b. It will be understood that the polarization direction of light reflected by the polarizer units 12a and 12b is not materially altered upon subsequent reflection by respective ones of the mirrors 14a, 14b. That is, the polarization direction of the light reflected by interference polarizer 12, subsequent to reflection by mirrors 14a, 14b, continues to be normal to the plane of the drawing and point into the plane of the drawing.

The light transmitted by polarizer 12, the light reflected by mirror 14a, and the light reflected by mirror 14b, are all linearly polarized, but incompletely. To improve the degree of polarization of these three light beams, three layers $P_1$, $P_2$, $P_3$ of polarizing material are provided, each disposed in the path of one of the aforementioned three light beams. Each of the three polarizing layers $P_1$, $P_2$, $P_3$ is so oriented that its preferential polarization direction coincides with the direction of the predominant component of the electric-field vector of the respective beam of light, so as to increase the degree of polarization of the respective beam of light by absorbing the energy associated with the perpendicular component of the electric-field vector of the respective beam of light. The preferential polarization direction of polarizing layers $P_1$ and $P_3$ is normal to the plane of the drawing and points into that plane. The preferential polarization direction of polarizing layer $P_2$ is parallel to the plane of the drawing and points upwardly (as viewed in the drawing).

The headlight of FIG. 4 includes three further components, namely three quarter-wave plates $F_1$, $F_2$, $F_3$, respectively disposed in the path of light transmitted by the three polarizing layers $P_1$, $P_2$, $P_3$. Each of these quarter-wave plates serves to convert the linearly polarized light transmitted by the respective polarizing layer $P_1$, $P_2$ or $P_3$ into circularly polarized light, so that the headlight projects a beam of circularly polarized light. This was also the case in the embodiment of FIG. 1; and as with the embodiment of FIG. 1, the windshield of the oncoming vehicle may be provided with a quarter-wave plate $F_G$ and a layer of polarizing material $P_G$.

Figure 5:
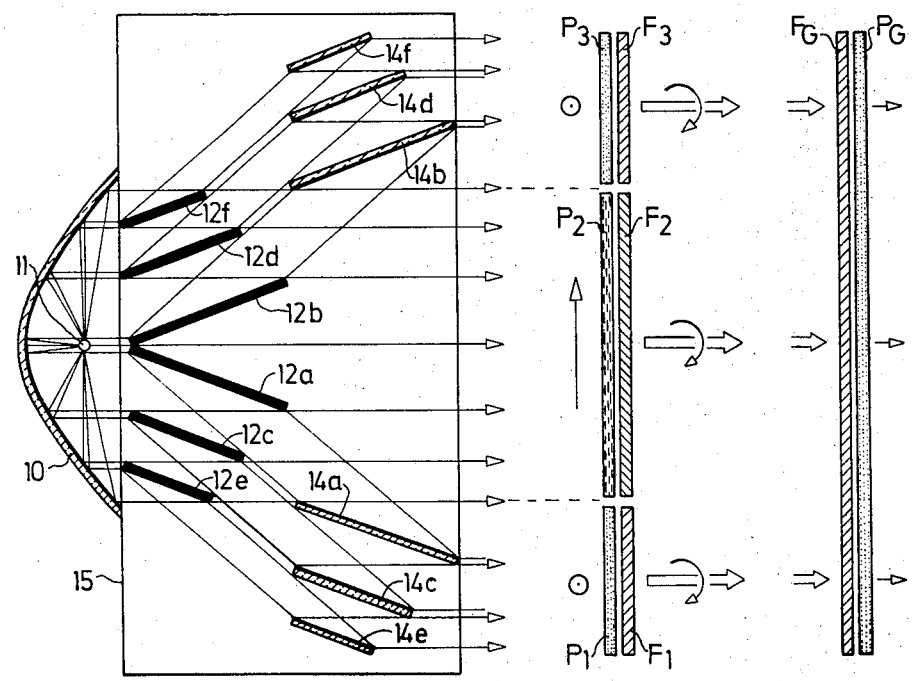
FIG. 5 illustrates a fifth embodiment according to the invention.

The embodiment shown in FIG. 5 is similar in basic concept to that shown in FIG. 4, the principal difference being that the interference polarizer units, again identified with reference numeral 12, are not embedded in a stepped prism arrangement. Instead, six difference polarizer units 12a, 12b, 12c, 12d, 12e, 12f are provided, disposed mirror symmetrical with respect to a horizontal symmetry plane including the optical axis. When viewing FIG. 5, it is to be remembered that this Figure is a cross-section through the headlight, and that the polarizer units 12a–12f extend for some distance normal to the plane of the drawing, both in direction into such plane and in direction out of such plane.

It will be noted that the six polarizer units 12a–12f are so spaced and disposed that substantially all the light rays reflected by the reflector 11 will encounter one of the six polarizer units 12a–12f.

The light reflected by reflector 11 and incident upon the lower three interference polarizer units 12a, 12c–12e will be in part transmitted in direction parallel to the optical axis and will be in part reflected in direction downwards, but not vertically downwards. The light reflected by reflector 11 and incident upon the three upper interference polarizer units 12b, 12d, 12f will be in part transmitted in direction parallel to the optical axis and will be in part reflected in direction upwards, but not vertically upwards.

The headlight of FIG. 5 further includes six planar mirror units 14a, 14b, 14c, 14d, 14e, 14f, each associated with one of the interference polarizer units 12a, 12b, 12c, 12d, 12e, 12f. Each of the mirror units is positioned in the path of light reflected by the associated one of the six polarizer units. Moreover, each of the mirror units 14a, 14b, 14c, 14d, 14e, 14f is so oriented relative to its respective polarizer unit as to reflect in direction parallel to the optical axis the light reflected by the respective polarizer unit. In considering FIG. 5, it will be understood that the view is a cross-sectional view, and that the six mirror units 14a–14f, like the six polarizer units 12a–12f, extend in direction normal to the plane of the drawing and extend for some distance both into the plane of the drawing and out of the plane of the drawing.

In the arrangement of FIG. 5, the planar mirror units 14a–14f are oriented parallel to the respective ones of polarizer units 12a–12f, to achieve reflection in direction parallel to the optical axis of the light reflected by the respective ones of the polarizer units 12a–12f.

In FIG. 5, the light waves transmitted by the six polarizer units 12a–12f, the light waves reflected by the upper three mirrors 14b, 14d, 14f, and the light waves reflected by the lower three mirrors 14a, 14b, 14c, are linearly polarized in the same manner as are the three parallel beams of light analogously produced in the embodiment of FIG. 4. However, each of these three beams of linearly polarized light is not 100 percent polarized, and to improve the degree of polarization, the arrangement of FIG. 5 is provided with three polarizing layers $P_1$, $P_2$, $P_3$ each associated with one of the three beams just mentioned. These three polarizing layers $P_1$, $P_2$, $P_3$ serve the same purpose as the similarly identified polarizing layers shown in the arrangement of FIG. 4. In the path of the light transmitted by each one of the polarizing layers $P_1$, $P_2$, $P_3$ is a respective one of three quarter-wave plates $F_1$, $F_2$, $F_3$. These three quarter-wave plates are provided for the same purpose as the three similarly identified plates in FIG. 4, namely to convert each of the three beams (the ones transmitted by the polarizers 12a–12f, the one reflected by the mirrors 14a, 14c, 14e, and the one reflected by the mirrors 14b, 14d, 14f) into a respective beam of circularly polarized light, so that the headlight projects a beam of circularly polarized light.

In order to avoid convective heating of the interference polarizer 12 and the mirror 14 by the light source 11, the latter being a high-power lamp (such as an iodine lamp), a light-transmissive separating wall 15 can be provided to separate the light source from the components 12 and 14.

Advantageously, the components 12 and 14 can be completely enclosed by light-transmissive separating walls, for this purpose.

It will be understood that each of the elements described above, or two or more together, may also find a useful application in other types of constructions differing from the types described above.

While the invention has been illustrated and described as embodied in a headlight, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a headlight of the type adapted to project a beam of polarized light, in combination, a light source; first polarizing means including a parabolic reflector having a focal point, said parabolic reflector being so positioned that said focal point is substantially coincident with the location of said light source so as to reflect light rays originating from said light source along substantially parallel paths; interference polarizer means positioned in said substantially parallel paths so as to polarize light originating from said light source but effecting only incomplete polarization of such light; and second polarizing means including absorption polarizer means positioned to further polarize light polarized by said interference polarizer means.

2. In a headlight a defined in claim 1, said parabolic reflector defining an optical axis parallel to the direction of light rays reflected by said reflector, and wherein said interference polarizer means is oriented at an angle of substantially 45° with respect to said optical axis.

3. In a headlight as defined in claim 2, wherein said first polarizing means comprises a prism arrangement of stepped rectangular configuration having outer planar surfaces parallel to said optical axis and also having outer planar surfaces normal to said optical axis, said interference polarizer means being located within said prism arrangement.

4. In a headlight as defined in claim 1, said interference polarizer means being so positioned and oriented with respect to said light source and with respect to said optical axis as to transmit in direction parallel to said optical axis a first portion of the light originating from said light source while reflecting a second portion of the light originating from said light source, and wherein said second polarizing means further comprising planar mirror means positioned outside the path of light travelling towards said interference polarizer means and in the path of light reflected by said interference polarizer means and so oriented as to reflect in direction parallel to said optical axis the light reflected by said interference polarizer means.

5. In a headlight as defined in claim 1, wherein said interference polarizer means comprises two interference polarizer units each oriented at an angle of 45° with respect to the optical axis and including between themselves an angle of 90°.

6. In a headlight as defined in claim 5, said two interference polarizer units being so positioned and oriented with respect to said light source and with respect to said optical axis as to transmit in direction parallel to the optical axis a first portion of the light originating from said light source, while reflecting a second portion of the light originating from said light source, and wherein said second polarizing means further includes two planar mirrors each oriented parallel to a respective one of said two polarizer units and each positioned outside the path of light travelling towards said polarizer units and in the path of light reflected by the respective one of said polarizer units and furthermore so oriented as to reflect in direction parallel to said optical axis the light reflected by the respective one of said two polarizer units.

7. In a headlight as defined in claim 4, wherein said second polarizing means further comprises a pair of absorption polarizing filters, one filter being positioned in the path of light transmitted by said interference polarizer means and having a preferential polarizing direction substantially parallel to the predominant polarization of the light transmitted by said interference polarizer means, and the other filter being positioned in the path of light reflected by said interference polarizer means and having a preferential polarizing direction substantially parallel to the predominant polarization of the light reflected by said interference polarizer means, the preferential directions of the two polarizing filters being perpendicular to each other, and wherein said second polarizing means further includes a pair of quarter-wave plates, one positioned in the path of light transmitted by one of said polarizing filters and the other positioned in the path of light transmitted by the other of said polarizing filters, to convert the linearly polarized light transmitted by said two polarizing filters into circularly polarized light.

8. In a headlight as defined in claim 4, the light transmitted by said interference polarizer means being polarized in direction substantially perpendicular to the direction of polarization of the light reflected by said interference polarizer means, and wherein said second polarizing means comprises half-wave plate means positioned in the path of light reflected by said interference polarizer means and so oriented as to change by 90° the direction of polarization of the light reflected by said interference polarizer means, so that the light transmitted by said half-wave plate means will be polarized in the same direction as the light transmitted by said interference polarizer means, and wherein said second polarizing means further includes absorption polarizing filter means positioned in the path of light transmitted by said interference polarizer means and by said half-wave plate means for increasing the degree of polarization of the transmitted light.

9. In a headlight as defined in claim 1, wherein said interference polarizer means comprises a plurality of interference polarizer units disposed on either side of a plane including said optical axis and disposed mirror-symmetrically with respect to said plane, said interference polarizer units being so positioned and oriented with respect to said light source and said parabolic reflector that substantially all the light rays reflected by said parabolic reflector and travelling in direction parallel to said optical axis encounter one of said interference polarizer units.

10. In a headlight as defined in claim 9, wherein said plurality of interference polarizer units consists of six interference polarizer units.

11. In a headlight as defined in claim 9, said plurality of interference polarizer units transmitting a first portion of the light originating from said light source and reflecting a second portion of the light originating from said light source, and wherein said said second polarizing means further includes planar mirror means positioned outside the path of light travelling towards said interference polarizer units but within the path of light reflected by said interference polarizer units and so oriented with respect to said interference polarizer units as to reflect in direction parallel to said optical axis the light reflected by said interference polarizer units.

12. In a headlight as defined in claim 11, wherein said planar mirror means comprises a plurality of mirror units arranged mirror-symmetrically with respect to said plane, with one mirror unit provided for each respective one of said polarizer units and so disposed relative to the respective polarizer unit as to reflect in axial direction the light reflected by the respective polarizer unit.

13. In a headlight as defined in claim 1, said interference polarizer means being mirror-symmetrical with respect to a plane including said optical axis and comprising two parts each located to one side of said plane and each so disposed that one half of the light travelling to the interference polarizer means is intercepted by one of said parts and the other half of the light by the other of said parts, with both of said two parts transmitting in direction parallel to the optical axis a first portion of the light originating from said light source, and with said two parts of said interference polarizer means each reflecting a portion of the light originating from said light source, with said two parts of said interference polarizer means being so oriented that the direction of light reflected by one of said parts and the direction of light reflected by the other of said parts are mirror-symmetrical with respect to said plane, and wherein said second polarizing means includes planar mirror means configurated mirror-symmetrical with respect to said plane and comprising two parts each located to one side of said plane and each so disposed relative to a respective one of said parts of said interference polarizer means as to reflect in direction parallel to said optical axis the light reflected by the respective one of said parts of said interference polarizer means, the light transmitted by said interference polarizer means being polarized in a direction different from the direction of the polarization of the light reflected by said planar mirror means; and further including three absorption polarization filters, one of which is located in the path of light transmitted by said interference polarizer means and has a preferential polarization direction substantially coincident with the predominant direction of polarization of the light transmitted by said interference polarizer means, and the other two of which are located in the path of light reflected by said planar mirror means and have respective preferential polarization directions substantially coincident with the predominent direction of polarization of the light reflected by said planar mirror means; and further including three quarter-wave plates each located in the path of light transmitted by a respective one of said three absorption polarization filter means and each so oriented relative to the absorption polarization filter means as to convert the polarized light transmitted by said three filter means into circularly polarized light.

14. In a headlight as defined in claim 4, the light transmitted by said interference polarizer means and the light reflected by said planar mirror means having different respective polarization directions, and wherein said second polarizing means comprises a first half-wave plate positioned in the path of light reflected by said planar mirror means to change the polarization direction of such light to the polarization direction of the light transmitted by said interference polarizer means, a second half-wave plate extending across the path of light transmitted by said first half-wave plate and the path of light transmitted by said interference polarizer means for changing the direction of polarization of the light transmitted by said first plate and said interference polarizer means, and an absorption polarizer filter extending across the path of light transmitted by said second half-wave plate for increasing the degree of polarization thereof.

* * * * *